Feb. 15, 1955 P. O. TAWNEY ET AL 2,701,895
VULCANIZATION OF BUTYL RUBBER WITH PARA SUBSTITUTED PHENOL
DIALCOHOLS, AND CURING BAG PRODUCED THEREBY
Filed Jan. 12, 1952
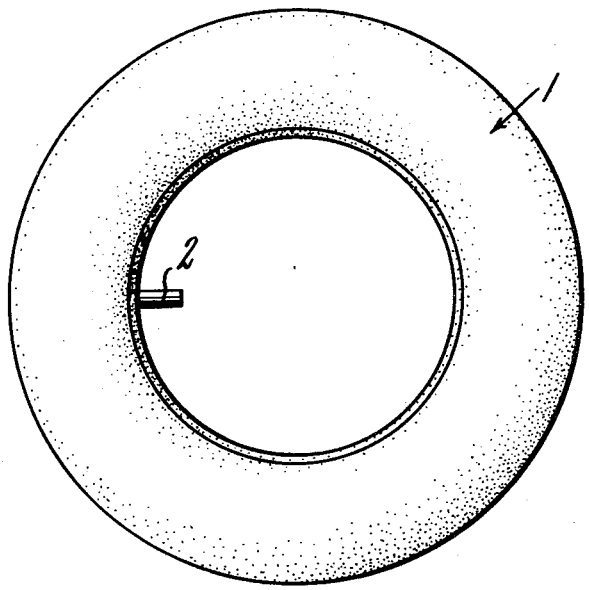
CURING BAG OF
BUTYL RUBBER VULCANIZED
WITH A PHENOL DIALCOHOL
INVENTORS
PLINY O. TAWNEY
JULIAN R. LITTLE
BY James J. Long
AGENT

2,701,895

VULCANIZATION OF BUTYL RUBBER WITH PARA SUBSTITUTED PHENOL DIALCOHOLS, AND CURING BAG PRODUCED THEREBY

Pliny O. Tawney, Passaic, and Julian R. Little, Packanack Lake, N. J., assignors to United States Rubber Company, New York, N. Y., a corporation of New Jersey Application January 12, 1952, Serial No. 266,146

18 Claims. (Cl. 18—45)

This invention relates to a new method of vulcanizing Butyl rubber, by means of certain phenol dialcohols, namely, the para substituted phenol dialcohols and to the resulting improved vulcanized products, especially curing bags.

The term "vulcanization" is used herein in its commonly accepted sense and has reference to the process of converting the Butyl rubber from the raw state in which it is a weak material having the typical properties of a plastic gum, into a strong, non-plastic typically elastic material. Unvulcanized or uncured Butyl rubber, like other raw elastomers, has no definite elastic limit, that is, upon slow application of tensile stress it elongates or strings out almost indefinitely without breaking, and it exhibits virtually no elastic recovery after the stress is removed. On the other hand, vulcanized or cured Butyl rubber, in common with other typical vulcanized elastomers, has a definite elastic limit, as well as the ability to return to substantially its original length after being stretched as much as several hundred per cent, that is, it exhibits high elastic recovery. The present invention is directed to an improved method of producing such vulcanized condition, as well as to the improved vulcanizates so obtained.

Butyl rubber is a well-known commercial synthetic rubber made by copolymerizing an isoolefin, usually isobutylene, with a minor proportion of a conjugated diolefin, usually isoprene or butadiene. The isoolefins used generally have from 4 to 7 carbon atoms, and such isomonoolefins as isobutylene or ethyl methyl ethylene are preferred. The diolefins employed usually are ordinary open-chain conjugated diolefins having from 4 to 8 carbon atoms, among which may be mentioned, in addition to the commonly used isoprene or butadiene, such compounds as piperylene; 2,3-dimethyl-1,3-butadiene; 3-methyl-1,3-pentadiene; 2-methyl-1,3-pentadiene; 1,3-hexadiene; and 2,4-hexadiene. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

The vulcanizing characteristics of Butyl rubber are quite distinct from the vulcanizing characteristics of the other synthetic rubbers and natural rubber, and, as a result, those skilled in the art have recognized Butyl rubber as generally presenting a special problem with respect to compounding for vulcanization. The peculiar problems encountered in attempting to cure Butyl rubber are believed to be largely a consequence of the extremely low unsaturation of the Butyl rubber, compared to that of the other vulcanizable rubbers. It is sometimes observed that substances which are good vulcanizing agents for other rubbers have little or no vulcanizing action on Butyl rubber. The special problems involved in curing Butyl rubber form the subject matter of a large number of published technical articles and issued patents. One aspect of the present invention is directed to a further improvement in the art of curing Butyl rubber.

Another aspect of the present invention lies in the provision of an improved curing bag. In the manufacture of pneumatic tires it is customary to employ an inflatable annular toroidal form, usually made of vulcanized rubber, and known as a curing bag or water bag. The curing bag is disposed within the raw tire casing as an aid in shaping the tire, and also for the purpose of applying internal heat and pressure to the tire casing in the molding press in which the tire is vulcanized. For this purpose the bag is inflated with a fluid heating medium, usually hot water, under pressure, which causes the bag to expand and thereby forces the tire casing into close conformity with the vulcanizing mold. Upon completion of the vulcanization, the curing bag is removed from the tire, and inserted in another raw tire for a repetition of the curing operation. The bag is thus repeatedly re-used for a number of cycles or turns.

The curing bag is subjected in use to a number of highly deleterious influences which place a definite limitation on the number of times the bag can be reused. Thus, each time a tire is vulcanized the bag is heated for prolonged periods to vulcanizing temperatures, with the result that the rubbery material from which the bag is made tends to become over-vulcanized. This condition is aggravated by the fact that the sulfur contained in the raw tire stock in contact with the curing bag surface tends to migrate or to diffuse into the bag material, and such migrated sulfur further vulcanizes the curing bag, to the extreme detriment of its physical properties. Also, the bag material is subject to oxidative attack as well as reversion, with resulting loss of elasticity and strength. Combination of these deleterious service conditions generally results in a rough or checked exterior surface on the bag which is directly transferred to the interior of a tire cured on the bag. This leaves the inner tire surface undesirably rough so as to aggravate tube chafing later on in service. The deterioration of the bag material advances with each successive cycle of use, until finally the bag is no longer fit for use and must be discarded.

In addition to the foregoing deleterious chemical influences, the bag is also subjected to considerable mechanical abuse, because it is severely twisted and rammed each time it is inserted in a raw tire casing, and it is roughtly pulled and distorted each time it is removed from the finished tire. Sometimes the weakened bag material will develop a hole or crack during these operations, and if the failure is not discovered in time a defective tire will be produced. Even the smallest leak in the curing bag can lead to an improperly cured tire. There is also danger that a weakened bag will burst when the vulcanizing mold is opened, injuring the operator.

The resulting necessity for discarding the curing bag after it has been used a number of times represents an appreciable expense in the manufacture of tires, and those skilled in the art have consequently devoted much effort to improving the curing bag so as to render it capable of giving better and longer service.

The present invention has as a principal object the amelioration of the foregoing difficulties. The invention provides a curing bag made of a Butyl rubber composition cured by means of a phenol dialcohol.

Another object of the present invention is to provide an improved method of curing or vulcanizing Butyl rubber that is largely free from certain of the disadvantages of the prior art methods of vulcanizing Butyl.

Another object is the provision of improved Butyl vulcanizates characterized by superior aging qualities and enhanced resistance to over-vulcanization by migratory sulfur.

The invention is based on the unexpected discovery that Butyl rubber is readily vulcanizable with certain phenol dialcohols, namely, the para-substituted phenol dialcohols to yield vulcanizates having remarkably improved properties.

Suitable phenol dialcohols can be made from a para-alkyl-phenol and formaldehyde in the presence of alkali, as shown by Honel in U. S. Patent 1,996,069, or Charlton et al., in U. S. Patent 2,364,192, and others, and by modifications which are well known. The para substituted phenol dialcohols belong in the class of materials known as resols, and they are reactive because of their terminal methylol groups. They are distinguished from the novolacs, which are made in acid medium with less formaldehyde, and which contain no terminal methylol groups and are therefore not reactive. Although the para substituted phenol dialcohols are reactive, they are not to be confused with the ordinary thermosetting phenol formaldehyde condensate. The latter contains three available reactive positions (the two ortho positions and the para position) and forms insoluble, infusible three-dimensional cross-linked products. The para substituted phenol dialcohols, in contrast, contain only two reactive positions (the third being "blocked" by the para substituent) and can therefore undergo only linear condensation.

The Carswell volume entitled "Phenoplasts," published by Interscience Publishers, New York, 1950, on pp. 17–22, discusses the formation of the monocyclic and multicyclic phenol dialcohols from para substituted phenols and aldehydes.

Examples of monocyclic phenol dialcohols include 2,6-dimethylol-4-tert. butyl phenol; 2,6-dimethylol-4-octyl phenol; 2,6-dimethylol-4-phenyl phenol; 2,6-dimethylol-4-benzyl phenol; 2,6-dimethylol-4-(alpha,alpha-dimethylbenzyl) phenol; 2,6-dimethyl-4-dodecyl phenol; and 2,6-dimethylol-4-cyclohexyl phenol. In the foregoing materials the para substituent is an alkyl, cycloalkyl, aryl or aralkyl radical.

Multicyclic phenol dialcohols are the polymeric dialcohols containing in each molecule more than one phenolic residue which can be formed as shown in Carswell by heating the corresponding monocyclic dialcohol. They are properly termed "condensation polymers" of the monomeric (i. e. monocyclic) phenol dialcohols, or, less accurately, they are frequently termed merely "polymers" of the simple phenol dialcohols.

For convenience, the term "phenol dialcohol" will be used to refer to any of the above defined monocyclic or multicyclic compounds, or to mixtures thereof, unless otherwise stated.

The multicyclic phenol dialcohols used in the invention usually are mixtures of the compounds shown in Carswell to be formed by heating monocyclic phenol dialcohol. While the individual multicyclic phenol dialcohols can be used in the invention they are not usually easy to make in a pure state. It is preferred to use the mixture of compounds because they act as effectively as the individual compounds and are much cheaper. The preferred phenol dialcohols for use in the invention are those in which the para substituent on the phenolic nucleus is a hydrocarbon radical, and more especially an alkyl radical. Most preferred are the compounds in which R is an alkyl radical containing at least four carbon atoms.

In the preferred form of the invention Butyl rubber is vulcanized with the phenol dialcohols in the presence of carbon black. However, the Butyl rubber can also be vulcanized in the absence of any filler or in the presence of fillers other than carbon black when using the multicyclic phenol dialcohols. The vulcanized products made without carbon black have useful properties, although they are less suitable for certain purposes than the products reinforced by carbon black. The non-black stocks find their greatest use in light colored products and products not requiring the reinforcement of carbon black. It is surprising to find that the multicyclic phenol dialcohols vulcanize the Butyl rubber even in the absence of carbon black, in view of the fact that the monocyclic phenol dialcohols do not vulcanize Butyl rubber to any practical degree in the absence of carbon black. In general, the multicyclic or polymeric phenol dialcohols are preferred because they are more efficient vulcanizing agents for Butyl than are the monocyclic phenol dialcohols.

A preferred form of the invention contemplates the use of the monocyclic phenol dialcohols in the form of their zinc salts, because the latter are easily powdered solids which are convenient to weigh and to handle. The crude commercial grades of the monocyclic phenols, in contrast to this, are usually very viscid liquids or sticky solids which are difficult to weigh accurately and to handle, and which are often malodorous and lachrymatory.

In practicing the invention the Butyl rubber and phenol dialcohol, and additionally any other desired optional ingredients such as accelerator, extender, plasticizer or fillers and the like, may be mixed in any convenient manner used in the rubber industry, e. g. on a mill or in an internal mixer. The compounded Butyl is then converted to any desired shape and size, and vulcanized at elevated temperatures, usually in the range of from 125 to 250° C., and preferably at 150 to 200° C. The vulcanization may be carried out in any commonly known manner, as in a mold under pressure, or in an open container in an oven, for a suitable period of time, usually within the range of from ¼ to 24 hours, the higher temperatures being employed with the shorter times within the stated ranges. The amount of phenol dialcohol used in the invention is preferably within the range of from 4 to 15 parts by weight to 100 parts of Butyl rubber. While smaller amounts may be used, e. g. 3 parts, it is usually found that less than 3 parts is insufficient to produce a practical cure. Also, larger amounts may be used, up to, for example, about 20 parts, but excessively large amounts are undesirable, since they tend to result in overcure and excessive brittleness in the product.

This new process of vulcanizing Butyl has the following advantages over the previously known processes.

1. The Butyl stocks vulcanized by the new process have a far better resistance to aging by air and steam at high temperature than does Butyl rubber vulcanized with sulfur. For example, Butyl tire curing bags vulcanized by phenol dialcohols according to the invention can be used to cure up to five times as many tires as conventional Butyl curing bags vulcanized with sulfur. Thus, these stocks are especially useful in products which must be kept for considerable periods of time at high temperatures in the presence of air and/or steam. Such products, other than the curing bags already mentioned, are Butyl rubber motor mountings, steam hose, gaskets and belts for hot machinery, conveyor belts for moving hot materials, flexible hot air ducts, hot water bottles, etc.

2. These new stocks may be used in contact with metals such as copper, silver, etc. which are tarnished by stocks vulcanized with sulfur.

3. The compounded but unvulcanized stocks may be processed at higher temperatures without scorching than can stocks vulcanized by sulfur. This is particularly advantageous when shaping articles by injection molding.

4. It is well known that free sulfur migrates from one stock to a second previously vulcanized one placed against it during vulcanization of the first one. This migration ordinarily causes the adjacent stock to be vulcanized also. This phenomenon causes a Butyl tire curing bag originally vulcanized with sulfur to be vulcanized further by additional sulfur migrating from the adjacent portions of the tire during vulcanization of the latter. This undesirable effect partially explains the relatively short service life of the curing bag, because it becomes progressively overvulcanized, and thus more susceptible to heat aging each time it is used to cure a tire. Also, some of the accelerator and any other compounding agents used in vulcanizing the Butyl bag with sulfur may migrate into the tire, causing unintentional and uneven changes in the vulcanization of the latter. It has been found that the phenol dialcohols used in the invention most fortunately either do not migrate into the adjacent tire or do not affect the tire if they do migrate. Consequently, the tire builder is now able as a result of the invention to control the uniformity of vulcanization of the tire more closely than heretofore, while at the same time obtaining a much greater service life from the curing bag.

The combination of advantages realized by the present vulcanization process renders the invention particularly suited for the manufacture of curing bags. In the accompanying drawing, the single figure illustrates a curing bag 1 made up of a vulcanizate of the invention. A suitable formulation for the curing bag is as follows:

Parts by weight
GR-I (a commercial grade of Butyl rubber made by copolymerizing isobutylene with isoprene, and containing about 2½% of combined isoprene) 100.00
Philblack "O" _____ 60.00
Stearic acid _____ 1.00
Amberol ST-137 (phenol dialcohol) _____ 12.00